United States Patent [19]

Sabase et al.

[11] 4,326,651
[45] Apr. 27, 1982

[54] APERTURED PLATE WITH ADJUSTABLE-CONSTRICTION MEMBER FOR PROVIDING SHIFTABLE BOTTOM WALL OF HOPPER FOR GRANULAR MATERIAL THAT IS JUXTAPOSED UPON A PLURALITY OF METERING COMPARTMENTS

[75] Inventors: Makoto Sabase, Higashimurayama; Mario Sakaitani, Chiba, both of Japan

[73] Assignee: Matsushita Industry Co., Ltd., Tokyo, Japan

[21] Appl. No.: 164,767

[22] Filed: Jun. 30, 1980

[30] Foreign Application Priority Data

Jul. 2, 1979 [JP] Japan .................... 54-89684[U]

[51] Int. Cl.³ .............................................. G01F 11/28
[52] U.S. Cl. ..................................... 222/439; 222/452
[58] Field of Search .................. 222/168.5, 305, 370, 222/438, 439, 452, 162

[56] References Cited

U.S. PATENT DOCUMENTS

| 493,146 | 3/1893 | Bender | 222/305 X |
|---|---|---|---|
| 842,167 | 1/1907 | Berg | 222/305 X |
| 2,710,118 | 6/1955 | Stoddard | 222/305 X |
| 2,877,937 | 3/1959 | Weir | 222/452 |
| 3,260,415 | 7/1966 | Minamiyama et al. | 222/452 X |
| 3,893,592 | 7/1975 | Friedman | 222/452 X |

FOREIGN PATENT DOCUMENTS 727721 10/1942 Fed. Rep. of Germany .
501900 2/1971 Switzerland .
504674 4/1971 Switzerland .

Primary Examiner—Gil Weidenfeld
Assistant Examiner—Fred A. Silverberg
Attorney, Agent, or Firm—Cushman, Darby & Cushman

[57] ABSTRACT

An improvement in apparatuses for quantitative metering of granular materials comprising: a main body having a plurality of independent metering compartments having upper and lower open ends and disposed radially around an axis; and top and bottom end plates adapted for covering the upper and lower open ends of the compartments and being rotatable about this axis, the top plate having a hole adapted for being brought into alignment with the upper open end of each compartment as this end plate is rotated, the bottom end plate having a hole so positioned as is not aligned with the hole of the top end plate and being adapted for being brought into alignment with the lower open end of each compartment as this end plate is rotated, so that, with the rotation of these end plates, a material requiring metering is fed into the compartments, one compartment after another, through the hole of the top end plate, and the metered material contained in these compartments is allowed to flow out through the hole of the bottom end plate from one compartment after another. The improvement comprises a projectable lug provided on the top end plate so as to slidably project beyond the trailing edge of the hole thereof toward the leading edge of this hole to limit the degree of area of this hole and being adapted to be maintained at any desired degree of projection.

2 Claims, 5 Drawing Figures

"APERTURED PLATE WITH ADJUSTABLE-CONSTRICTION MEMBER FOR PROVIDING SHIFTABLE BOTTOM WALL OF HOPPER FOR GRANULAR MATERIAL THAT IS JUXTAPOSED UPON A PLURALITY OF METERING COMPARTMENTS

BACKGROUND OF THE INVENTION (a) Field of the invention

The present invention concerns an apparatus for quantitatively metering granular materials such as powders and particles of synthetic resins for use as starting materials, pigments, cement, fertilizers and foodstuffs.

(b) Description of the prior art

As apparatuses of this type, there is known an apparatus comprising a main body having a plurality of independent metering compartments having upper and lower open ends and disposed radially around an axis, and top and bottom end plates adapted for covering said upper and lower open ends of the compartments and being rotatable about this axis, the top end plate having a hole adapted for being brought into alignment with the upper open end of each compartment as this end plate is rotated, the bottom end plate having a hole so positioned as is not aligned with the hole of the top end plate and being adapted for being brought into alignment with the lower open end of each compartment as this end plate is rotated, so that, with the rotation of these end plates, a material requiring metering is fed into the compartments successively through the hole of the top end plate, and the metered material contained in the compartments is allowed to flow out through the hole of the bottom end plate from one compartment after another. However, such known metering apparatus has the disadvantage that the granular material requiring metering enters into a small space formed between the trailing edge of the hole of the top end plate through which the material is fed into the metering compartment and the uppermost wall edge of a partition wall which defines adjacent metering compartments, resulting in hampering the smooth rotation of the end plates.

SUMMARY OF THE INVENTION

The present invention intends to seek an improved metering apparatus which can prevent the occurrence of entry of granular material requiring metering into a narrow space formed between the trailing edge of the hole of the top end plate through which the material is fed into a compartment and the uppermost wall edge of a partition wall which defines adjacent compartments, to thereby always insure a smooth rotation of the end plates, and further that said apparatus is able to adjust the volume of the material to be metered in the respective compartments. To this end, the present invention provides an apparatus for quantitative metering of granular materials such as powders and particles of synthetic resins for use as starting materials, pigments, cement, fertilizers and foodstuffs, comprising a main body having a plurality of independent metering compartments having upper and lower open ends and disposed radially around an axis, and top and bottom end plates adapted for covering said upper and lower open ends of the compartments and being rotatable about this axis, the top end plate having a hole adapted for being brought into alignment with the upper open end of each compartment as this end plate is rotated, the bottom end plate having a hole so positioned as is not aligned with the hole of the top end plate and being adapted for being brought into alignment with the lower open end of each compartment as this end plate is rotated, so that, with the rotation of these end plates, a material requiring metering is fed into a compartment through the hole of the top end plate, and the metered material contained in the compartment is allowed to flow out through the hole of the bottom end plate as the end plates are rotated, the improvement comprising a projectable lug provided on the top end plate so as to slidably project beyond the trailing edge of the hole thereof toward the leading edge of this hole to limit the degree of area of this hole and being able to be held at any desired degree of projection.

DETAILED DESCRIPTION OF THE PREFERRED EMBODIMENT

Figure 1:
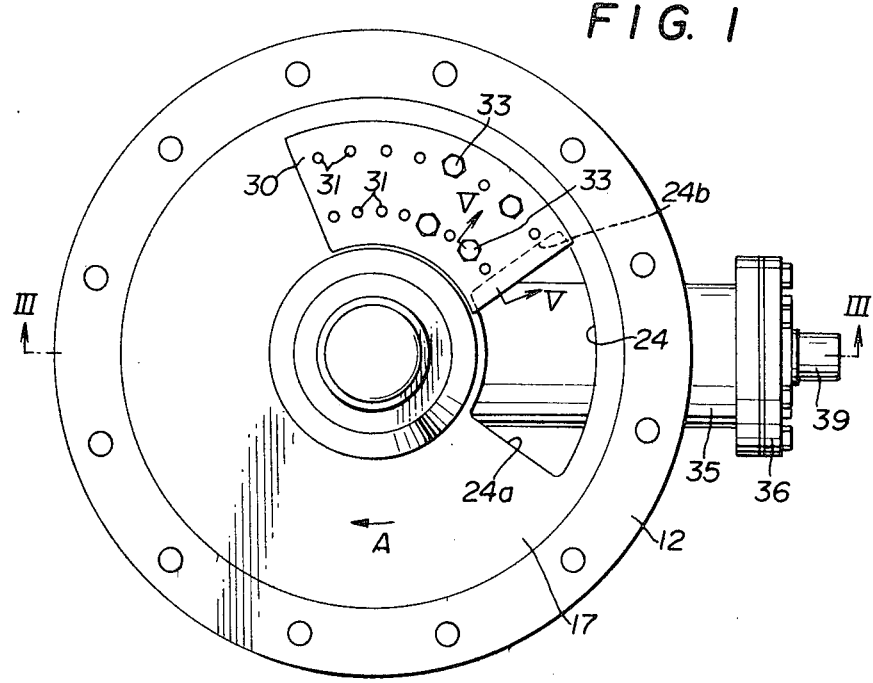
FIG. 1 is a diagrammatic plan view of the metering apparatus of the present invention.
Figure 2:
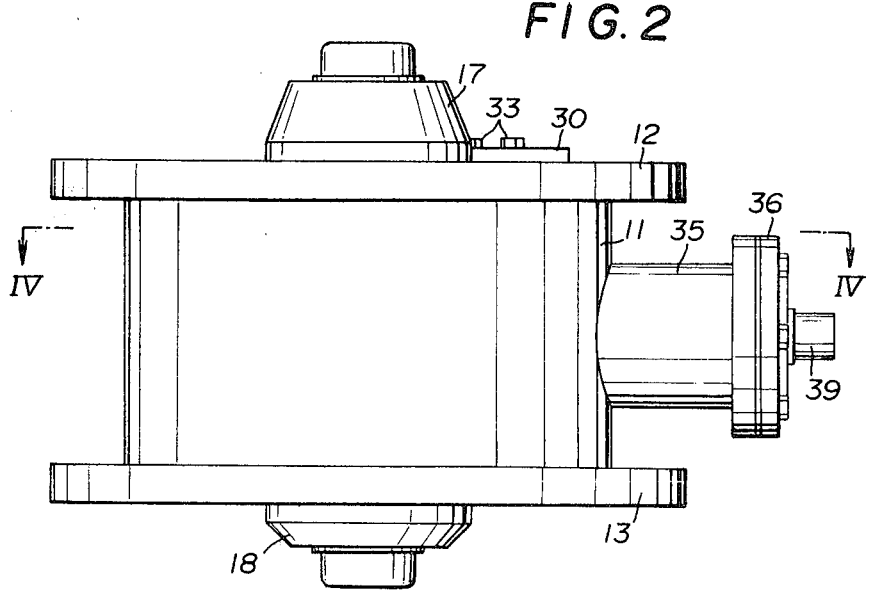
FIG. 2 is a diagrammatic side elevation of the metering apparatus of the present invention.
Figure 3:
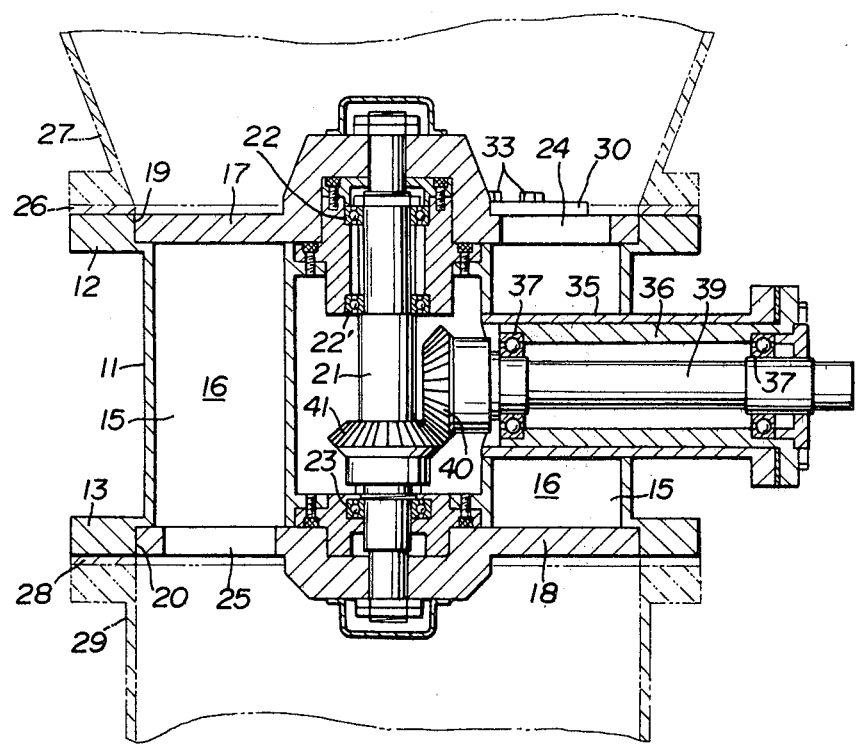
FIG. 3 is a diagrammatic sectional view of the metering apparatus taken along the line III—III in FIG. 1.
Figure 4:
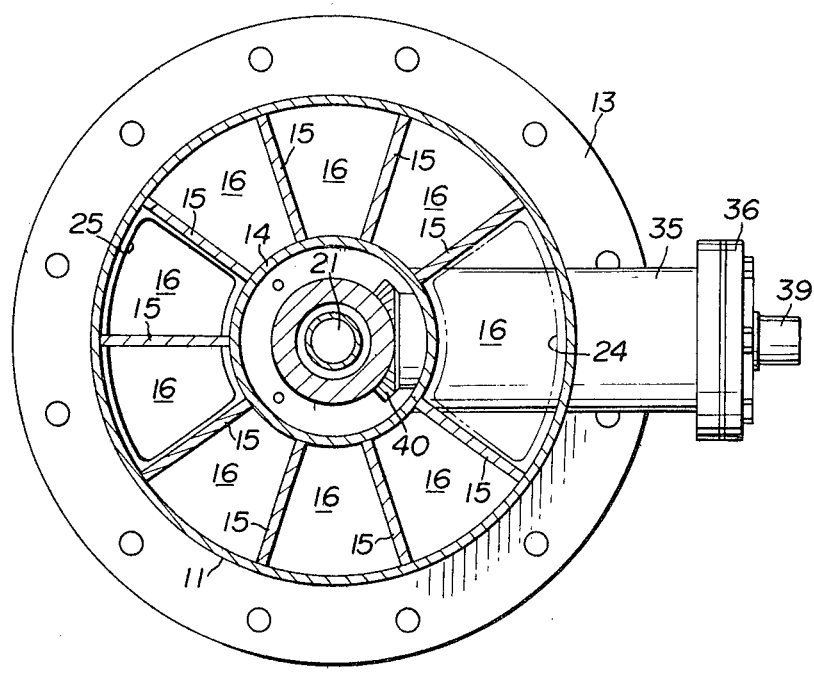
FIG. 4 is a diagrammatic sectional view of the metering apparatus taken along the line IV—IV in FIG. 2.
Figure 5:
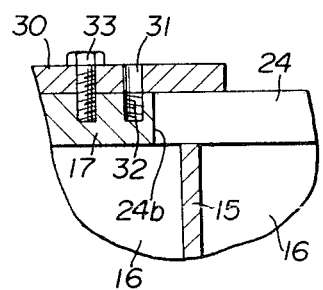
FIG. 5 is a diagrammatic sectional view, in an enlarged scale, of a part of the metering apparatus of the present invention taken along the line V—V in FIG. 1, in the state that the end plates and the lug are positioned in the foreground of a partition wall.

The body 11 of the apparatus is cylindrical in shape, and has flanges 12 and 13 at opposite ends of this cylindrical body. A central hollow cylinder 14 is arranged at the central part of this body 11. A plurality of partition walls 15 are disposed to extend radially between the body 11 and the central hollow cylinder 14, and they are fixed to the body by an appropriate means such as welding to provide a plurality of independent metering compartments 16 having open opposite ends.

The respective metering compartments 16 are covered, at both upper and lower open ends, with top and bottom end plates 17 and 18, respectively. These top and bottom end plates 17 and 18 are secured to the body 11 for rotation within annular grooves 19 and 20, respectively, which are provided on the flanges 12 and 13, respectively. The upper and lower end faces of the respective partition walls 15 are in snug contact with the end plates 17 and 18, respectively, in such way that these end faces do not interfere with the smooth rotation of these end plates. On the other hand, a shaft 21 is provided within the central hollow cylinder 14. This shaft 21 is supported by bearings 22, 22' and 23 which are fixed to the inside of the central hollow cylinder. The respective end plates 17 and 18 are fixed to the shaft 21 by screw nuts and key engagement onto the end portions of the shaft, respectively. The respective end plates 17 and 18 are provided with holes 24 and 25, one for each end plate. These two holes are arranged so that they are brought into alignment with the end openings of different metering compartments, respectively. More particularly, these holes 24 and 25 are formed in the top end plate 17 and the bottom end plate 18 in such way that, in case the hole 24 of the top end plate 17 is aligned with the upper opening of a certain metering compartment, the hole 25 of the bottom end plate 18 is aligned with another metering compartment which is located 180° from said certain metering compartment. In this embodiment, these holes 24 and 25 are shaped in sector form having their centers lying at the axis of rotation of the shaft 21 and each has such size as to overlap at least one metering compartment.

In the above state of the apparatus, let us assume that a material consisting of a powder or particles requiring metering is filled into a hopper 27 secured by a bolt means, through a gasket 26, to the flange 12 of the body 11. This granular material is allowed to flow into the compartment through the hole 24 of the top end plate 17. This flow of material continues, when the plate 17 is rotated in the direction of the arrow A, till both of the leading edge 24a and the trailing edge 24b of the hole 24 have passed this compartment. The material requiring metering is thus filled in the metering compartment during the period in which both of the leading edge 24a and the trailing edge 24b of the hole 24 traverse the upper opening of this compartment. In this way, the material is filled in the respective adjacent metering compartments in succession during the rotation of the end plates through 180°. When the plates are rotated through 180°, the hole 25 of the bottom end plate 18 is brought into alignment with that compartment initially filled with the material. Thus, the metered material is allowed to flow outside of the apparatus through the hole 25 into a duct 29 which is bolt-fastened via a gasket 28 to the lower flange 13. Thus, on and after the rotation of the end plates through 180°, the filling and discharging of the material is carried out simultaneously in compartments which are located 180° away relative to each other, successively from one compartment after another.

In the metering apparatus of the present invention, arrangement is provided to prevent, when a material requiring metering is to be filled into a compartment, the entry of the material into a narrow space formed between the trailing edge of the hole or the underside face of the top end plate located adjacent this trailing edge of the hole and the upper end face of a partition wall defining adjacent metering compartments, to avoid the hampering of smooth rotation of the end plates. To this end, a lug 30 is provided preferably on the upper surface of the top end plate 17. This lug 30 is arranged so that it can be projected beyond the trailing edge 24b toward the leading edge 24a of the hole 24 to limit the area of this hole 24. This lug 30 arrives at the partition wall 15 before the trailing edge of the hole 24 arrives there during the rotation of the end plates. Accordingly, this lug 30 deflects the direction of the downward flow of the granular material toward another adjacent partition wall located just ahead of the first-occurring partition wall, and prevents the material to flow along said first-occurring partition wall located just below the trailing edge of the hole. Thus, this lug 30 successfully prevents the entry of the granular material into the space formed between the trailing edge or the underside face of the top end plate located adjacent this trailing edge, and the upper end of the partition wall.

Furthermore, according to the present invention, this lug 30 is arranged so that it is slidably moved from the trailing edge toward the leading edge of the hole 24 up to a desired position to be held thereat, to limit the size of the hole 24 as required. Accordingly, the size of the hole 24 can be varied as desired, to thereby vary the volume of the granular material to be filled in the respective metering compartments. The lug 30 is of such a sector shape as will be able to completely close the hole 24. Bolt holes 31 are provided at equal intervals in the lug 30 forming an arc pattern about the axis of rotation of the shaft 21. Screw holes 32 are provided in the top end plate 17 at equal intervals at sites as will correspond to said bolt holes of the lug 30. By screwing a bolt 33 into the screw holes 32 through the bolt holes 31, the lug 30 is fixed to the top end plate 17. Accordingly, by selecting an appropriate screw hole 32, the lug is bolt-fastened through the bolt hole 31 into the screw hole 32 so as to insure that the lug 30 extends for a desired distance beyond the trailing edge of the hole 24 of the top end plate 17 toward the leading edge thereof, the size of the hole 24 can be limited as required. Thus, the entry of the granular material into the narrow space between the underside portion of the top end plate adjacent the trailing edge of the hole 24 and the upper end edge of the partition wall of a compartment can be prevented.

The arrangement of the top and bottom end plates and the shaft to which these end plates are fixed can be made in various ways. In the embodiment shown, the end plates are arranged to be rotated about a fixed shaft by a motor provided externally of the apparatus. More particularly, an outer hollow member 35 is disposed between the body 11 and the central hollow cylindrical member 14 and is fixed to both of them so as to traverse a metering compartment to which this hollow member is fixed also. An inner hollow member 36 is snugly received inside the outer hollow member 35. A flange which is provided at the peripheral part of this inner hollow member 36 is bolt-fastened to a peripheral flange of the outer hollow member 35, so that the outer hollow member 35 is prevented from being rotated. Bearings 37 and 38 are fixed inside the inner hollow member 36, and a shaft 39 is supported by these bearings. A bevel gear 40 is positioned within the central hollow cylindrical member 14 and is fixed to the inner end of the shaft 39. Another bevel gear 41 is fixed to the shaft 21 and meshes with the bevel gear 40. The outer end of the shaft 39 is coupled to the rotary shaft of the motor not shown by, for example, a chain and a sprocket not shown. When this motor rotates the shaft 39, the shaft 21 is rotated along with the top and bottom end plates 17 and 18.

What is claimed is:

1. In an apparatus for quantitatively metering granular material such as powders and particles of synthetic resin for use as starting material, pigments, cement, fertilizers and foodstuffs, comprising a main body having a plurality of independent stationary metering compartments having upper and lower open ends and disposed radially around an axis, and top and bottom end plates adapted for covering the upper and lower open ends of the compartments and being rotatable about said axis, the top plate having a hole adapted for being brought into alignment with the upper open end of each compartment as this end plate is rotated, the bottom end plate having a hole so positioned as is not aligned with the hole of the top end plate and being adapted for being brought into alignment with the lower open end of each compartment as this end plate is rotated, so that, with the rotation of these end plates, a material requiring metering is fed into the compartments, one compartment after another, through the hole of the top end plate, and the metered material contained in these compartments is allowed to flow out through the hole of the bottom end plate from one compartment after another, the improvement comprising a projectable lug provided on the top end plate so as to slidably project beyond the trailing edge of the hole thereof toward the leading edge of this hole to limit the degree of area of this hole and being adapted to be maintained at any desired degree of projection.

2. In an apparatus for quantitatively metering granular material, comprising:
- a main body having a plurality of individual metering compartments each having an essentially completely open upper end and a lower end, said compartments being arranged adjacent one another in a series so that at their upper ends the compartments are separated from one another only by the upper edges of respective vertically disposed compartment divider plates;
- a top end plate covering the upper end of the compartments;
- means defining a hole through said top end plate, said hole being so sized and shaped that by shifting said top end plate along said series, transversally of the open upper ends of said compartments, said hole is successively brought into alignment with each said open upper end;
- means for so shifting said top end plate;
- a hopper for granular material, said hopper being juxtaposed upon said top end plate so that said top end plate functions as a bottom wall for said hopper, the improvement wherein:
said apparatus further includes a lug plate; and
means for adjustably mounting said lug plate upon said top end plate in the vicinity of said hole so that said lug plate projects vertically over said hole from the relatively trailing edge of said hole towards the relatively leading edge of said hole by an amount that may be made larger and smaller in order to simultaneously vary the effective horizontal area of said hole and prevent entry of granular material into that space within each compartment which would tend to be last-filled by granular material flowing from said hopper into the succession of compartments through said hole upon said shifting of said top end plate;
said series of compartments is arranged in a circle;
each compartment lower end is open; and
said apparatus further comprises;
a bottom end plate covering the lower end of the compartments;
means connecting said bottom end plate to said top end plate for shifting therewith;
said shifting means being adapted to rotate said top and bottom plates together as a unit;
means defining a hole through said bottom end plate;
said bottom end plate and said hole therethrough being so sized, shaped and located relative to said top end plate and said hole therethrough that no said individual compartment is simultaneously being filled from said hopper through said hole in said top plate and emptied through said hole in said bottom plate.

* * * * *